United States Patent [19]

Sapers et al.

[11] Patent Number: 4,814,192

[45] Date of Patent: Mar. 21, 1989

[54] PROCESS FOR PRESERVING RAW FRUITS AND VEGETABLES USING ASCORBIC ACID ESTERS

[75] Inventors: Gerald M. Sapers, Warrington; Kevin B. Hicks, Glenside, both of Pa.; Paul A. Seib, Manhattan, Kans.

[73] Assignee: The United States of America as represented by the Secretary of Agriculture, Washington, D.C.

[21] Appl. No.: 123,451

[22] Filed: Nov. 18, 1987

[51] Int. Cl.$^4$ .......................... A23B 4/12; A23B 7/10; A23L 1/277

[52] U.S. Cl. .................... 426/268; 426/321; 426/323; 426/326; 426/333

[58] Field of Search ............. 426/321, 268, 323, 326, 426/330, 330.5, 330.6, 331, 333

[56] References Cited

U.S. PATENT DOCUMENTS

| | | | |
|---|---|---|---|
| 3,754,938 | 8/1973 | Ponting | 99/154 |
| 3,764,348 | 10/1973 | Huxsoll et al. | 426/310 |
| 4,542,033 | 9/1985 | Agarwala | 426/639 |
| 4,647,672 | 3/1987 | Seib et al. | 549/222 |

OTHER PUBLICATIONS

C. H. Lee et al., "Chemical Synthesis of Several Phosphoric Esters of L-Ascorbic Acid," Carbohydr. Res., 67: 127–138 (1978).

R. C. Cousins et al., "Synthesis of 6-Fatty Acid Esters of L-Ascorbic Acid," J. Am. Oil Chem. Soc., 54: 308–312 (1977).

*Primary Examiner*—Donald E. Czaja
*Assistant Examiner*—Helen Pratt
*Attorney, Agent, or Firm*—M. Howard Silverstein; Beverly K. Johnson; John D. Fado

[57] ABSTRACT

A process of inhibiting enzymatic browning in mechanically injured, raw fruit and vegetable products, including juices, comprising treating the products with ascorbic acid-2-phosphate esters and ascorbyl-6-fatty acid esters, individually or in combination. The treatments may be applied in an aqueous carrier and may further comprise other browning inhibitors, polyphenol oxidase inhibitors, emulsifying agents, dispersing agents and complexing agents. Treatments tend to delay or prevent the onset of enzymatic browning or, once browning has begun, to limit the extent of enzymatic browning. Also disclosed are novel browning.

11 Claims, No Drawings

PROCESS FOR PRESERVING RAW FRUITS AND VEGETABLES USING ASCORBIC ACID ESTERS

BACKGROUND OF THE INVENTION

1. Field of the Invention

The present invention relates to the preservation of raw fruits, vegetables and their juices. More particularly, the present invention relates to the use of certain ascorbic acid esters, and compositions thereof, to control enzymatic browning in raw fruit and vegetable products.

2. Description of the Prior Art

Browning of raw fruits and vegetables due to mechanical injury, e.g., peeling, cutting, slicing, crushing etc., during postharvest processing has caused major losses in quality and value in the affected commodities. This enzymatic browning results from the polyphenol oxidase-catalyzed oxidation of phenolic compounds to O-quinones which sequentially polymerize to form dark-colored pigments.

Heretofore, efforts to control enzymatic browning in unblanched, cut fruits and vegetables have primarily involved sufite treatments to preserve their natural color. However, recent concerns over the adverse health effects from sulfites has stimulated much research to develop effective sulfite substitutes. A number of sulfite substitutes, mostly combinations of ascorbic or erythorbic acid with citric acid, phosphates and chlorides, have been developed. These formulations, however, do not usually provide the extended protection obtained with sulfites. This deficiency is due largely to the rapid oxidation of ascorbate or erythorbate, catalyzed by endogenous enzymes and copper in the raw commodity.

Consequently, there exists a need in the food industry for sulfite alternatives which are safe, economical and effective.

SUMMARY OF THE INVENTION

We have now developed a process of preserving mechanically injured raw fruit and vegetable products, including juices, by controlling enzymatic browning in these commodities. The invention process involves subjecting the fruit and vegetable products to certain ascorbic acid esters and/or compositions thereof, for a period of time sufficient to inhibit browning. The treatments offer suitable replacements for potenitally toxic sulfite treatments currently being used to preserve these commodities.

Accordingly, it is an object of the present invention to provide a novel process for preserving raw fruits, vegetables and their juices.

Another object is to provide a process for preserving these fruits and vegetables products which eliminates the use of sulfites.

Further, it is an object of the invention to provide novel compositions useful to inhibit enzymatic browning in mechanically injured fruits and vegetables and their juices.

In general, we have accomplished the foregoing objects by providing a process for preserving mechanically injured raw fruits and vegetables comprising subjecting the fruits and vegetables to an effective antibrowning amount of an antibrowning compound selected from the group consisting of (a) ascorbic acid esters formed by reacting ascorbic acid at the number 2 carbon atom with a phosphoric acid; and (b) ascorbyl-fatty acid esters formed by reacting ascorbic acid at the number 6 carbon atom with a fatty acid. The effect of treatments in accordance with the invention process is to lengthen the storage life of mechanically injured fruit and vegetable products by either extending the time before the onset of browning, i.e., lag time, or once browning has begun, decreasing the extent or rate of enzymatic browning.

DETAILED DESCRIPTION OF THE INVENTION

The ascorbic acid phosphate esters useful in the invention process are those esters in which the number 2 carbon atom of ascorbic acid has been esterified with a phosphoric acid. Examples of such esters include ascorbic acid-2-phosphate, ascorbic acid-2-diphosphate, ascorbic acid-2-triphosphate and ascorbic acid-2-polyphosphate. The esters of ascorbic acid may be prepared by reacting ascorbic acid with salts of a metaphosphoric acid in accordance with the procedure as described in Seib et al., U.S. Pat. No. 4,647,672, issued Mar. 3, 1987. Ascorbic acid-2-phosphate may also be prepared by the condensation of ascorbic acid and phosphoric acid using the procedure as described in Lee et al. [Carbohydrate Res. 67: 127–138 (1978)].

The ascorbyl-fatty acid esters useful in the invention process are those esters in which the number 6 carbon atom of ascorbic acid is reacted with a fatty acid. Suitable fatty acids include palmitic, lauric, decanoic, octanoic acids and the like. The ascorbyl-6-fatty acid esters may be prepared by reacting ascorbic acid with excess fatty acid in accordance with the procedure as described in R. C. Cousins et al. [J. Am. Oil Chem. Soc. 54: 308–312 (1977)].

For optimum results, the compounds useful in the invention process should be used in substantially pure form, that is, free of undesirable contaminants that tend to mask or otherwise inhibit their effectiveness. It is within the compass of the invention to use the ascorbic-acid esters either individually or in combination. The compounds and/or compositions may also be used in conbination with known browning inhibitors, such as ascorbic acid or erythorbic acid, or in combination with polyphenol oxidase inhibitors such as cinnamic acid, certain other phenolic acids, citric acid or the like. In addition, the compositions of the invention may include conventional additives such as emulsifiers, acidulants and dispersing agents.

Suitable emulsifiers for use in the invention compositions include, but are not limited to, monoglycerides, diglycerides, glycol esters of fatty acids, polyglycol esters of fatty acids and mixtures thereof. Preferably, the emulsifiers are selected to have a low to moderate hydrophilic/lipophilic balance. Suitable dispersing agents include xanthan gum, carboxymethylcellulose, guar gum, pectin and the like. The term "acidulants" as used herein is used to designate any food-grade additive which serves to lower the pH of the invention ester compositions to a value that is below the optimal pH value for polyphenol oxidase. Suitable acidulants include citric acid, gluconic acid, lactic acid and the like.

The compositions of the invention may also include complexing agents such as citric acid, cyclodextrins and the like. A particular effective complexing agent found to enhance antibrowning activity of the ascorbic acid and its ester derivatives is an acidic polyphosphate having a 1:1 ratio of $P_2O_5:Na_2O$. When used, the acidic polyphosphate, as well as the other additives mentioned hereinabove, should be used in concentrations which, as readily determined by one skilled in the arts, will not interfere with the effectiveness of antibrowning agents of the invention.

In use, the ester compositions are dispersed directly in an aqueous carrier. Because of the insolubility of ascorbyl-fatty acid esters in water, it may be necessary to first dissolve the fatty acid esters in a more soluble medium, e.g., ethyl alcohol or propylene glycol, prior to addition to an aqueous system. For example, a stable aqueous dispersion of ascorbyl palmitate was prepared by dissolving the ester with a low hydrophilic/lipophilic balanced emulsifying agent in ethyl alcohol. The emulsifier-ascorbyl palmitate solution was then added to an aqueous solution containing a phophate buffer, pH 7, heated at about 75° C. Thereafter, the aqueous dispersion was cooled to about 40° C.–50° C. for immediate use.

Aqueous solutions or dispersions of the ester compositions may be applied to sliced fruits and vegetables by conventional methods such as dipping or spraying. Exemplary concentrations useful for dipping or spraying range from about 22.27 mM to 181.8 mM. Because of the insolubility of the ascorbyl-fatty acid esters, lower concentrations of the esters may be used, for example, from about 2.4 mM to 22.1 mM. Aqueous solutions or dispersions of the ester compositions of the invention are added directly to juice systems in relative lower concentrations than used for sprays or dips. For example, concentrations may range from about 0.28 mM to about 4.4 mM.

The process of the invention is useful to preserve the storage life of any mechanically damaged fruit or vegetable which undergoes enzymatic browning, i.e., polyphenol oxidase oxidation of polyphenols. Consequently, the invention procedure is useful to preserve the products of a variety of raw fruits and vegetables including, but not limited to, apples, pears, bananas, avocados, potatoes, lettuce, mushrooms and the like.

The process of the invention is further demonstrated by the following examples which are intended only to further illustrate the invention and not to limit the scope of the invention as defined by the claims.

EXAMPLE 1

The effectiveness of the process of the invention was evaluated in a raw apple juice system and on standardized cut apple surfaces.

Apple samples representing common cultivars were obtained from local food stores during the fall and winter of 1986-87 and stored briefly at 4° C. until used. One hour prior to use, fruits were removed from refrigeration and equilibrated at room temperature (ca 20° C.).

Browning at Cut Surfaces

Each apple was cut in half along the stem axis, and the halves were positioned in a Petri dish, cut side down, under an electric cork borer (Sargent-Welch, Skokie, IL) so that uniform plugs could be bored perpendicular to the cut surface, on either side of the point of greatest thickness, with a 22 mm stainless steel cutting tube. At the start of an experiment, a transverse cut was made in the plug, at its midpoint, yielding two half-plugs sharing a common cut surface. An arrow was cut at the opposite end of each plug half to mark its orientation during reflectance measurements.

Apple plugs were treated by dipping in freshly prepared aqueous solutions or dispersions of the targeted browning inhibitor for 90 seconds. Treatments were applied to one plug half from each pair of plug halves. The remaining plug halves which were to be used as untreated controls were dipped in pure water. After dipping, the plug halves were drained, blotted dry and held for 7 hrs at 20° C.

Color changes were measured in treated samples and untreated controls during storage at 20° C. Colorimetry was performed with a Gardner XL-23 Tristimulus Colorimeter (Pacific Scientific, Silver Spring, MD), operated with large diameter illumination and with a 19 mm opening aperture plate. The instrument was standardized against a white tile (Y=84.60, X=82.21, Z=97.64) before each measurement. The transversely cut surface of a plug was centered over the aperture, oriented so that the arrow cut in the opposite end pointed away from the colorimeter operator. Values of the tristimulus coordinates in the L, a, b and Y, X, Z systems were recorded at 1, 10, 30, 60, 90, 120, 150, 180, 240, 300, 360 and 420 minutes. Between measurements, plugs were held in covered glass crystallizing dishes to minimize dehydration at the cut surface. The tristimulus coordinates were plotted against log time, and the slopes of linear portions of these curves were obtained by linear regression. Lag times were obtained from these graphs by direct measurement.

Browning in Juice

Juice samples were prepared from individual Granny Smith apples with an Acme Supreme Model 6001 Juicerator. The freshly prepared juices from 2 or 3 apples were combined, briefly stirred to ensure uniformity and then rapidly dispersed by burette into cylindrical clear glass optical cells containing the targeted antibrowning composition.

Colorimetry of the juice samples were performed as described above but with the optical cell placed in a 50 mm diameter support ring in place of the 19 mm aperture plate. Tristimulus values were recorded at frequent intervals up to 24 hours and were plotted against time rather than log time. Lag times were obtained from these graphs by direct measurement.

Alternatively, browning in apple juice was determined spectrophotometrically by taking, at 15 minute interval, 10 ml aliquots of a 100–125 ml juice sample which was continually mixed slowly by stirring. Thereafter, the aliquots were clarified by a modification of the method of Meydav et al. [J. Agric. Food Chem. 25: 602 (1977)] which entails rapid mixing with an equal volume of 95% ethanol and 0.3 g Celite Analytical Filter Aid (Fisher Scientific, Pittsburg, PA) followed by filtration through Whatman No. 50 paper under suction. The absorbance of the filtrates was determined at 420 nm with a Perkin-Elmer Model 552 UV-visible spectrophotometer (Perkin-Elmer, Oak Brook, IL).

Various antibrowning compositions of the invention were tested for browning inhibition using the process of the invention. The effectiveness of treatments was expressed in terms of percent inhibition. For purposes of the invention, percent inhibition is defined as the change in the reflectance or absorbance of the treated sample over a specified time interval ($\Delta L$ treatment) subtracted from the change in reflectance or absorbance in the corresponding untreated control ($\Delta L$ control), expressed as a percentage of the change in the control:

$$\% \text{ Inhibition} = \frac{\Delta L \text{ control} - \Delta L \text{ treatment}}{\Delta L \text{ control}} \times 100$$

A percent inhibition value of 100 indicates complete inhibition of browning while a value of 0 indicates no inhibition. Results are recorded in tables below.

When compared to ascorbic acid, the ascorbic acid esters offered increased browning inhibition on the cut surfaces of raw apple plugs. As shown in Table I, the two phosphorylated esters of ascorbic acid were more effective than ascorbic acid when applied as a dip to the plugs. The primary effect of ascorbic acid-2-phosphate was to extend the lag time rather than to decrease the browning rate, while the corresponding trisphosphate ester decreased the rate of browning. Ascorbyl palmitate also exerted antibrowning inhibition for a longer period of time than ascorbic acid. The emulsifier used to prepare the ascorbyl palmitate solution was sold by Durkee Industrial Foods, SCM Corporation of Cleveland, OH., under the tradename "EC-25".

The effectiveness of the ascorbic acid derivatives as compared to ascorbic acid was also demonstrated in juice systems. As shown in Table II, the ascorbic acid derivatives were more effective than equivalent concentrations of ascorbic acid when screened in Granny Smith juice. Even more effective were combinations of ascorbic acid and the ascorbic acid esters with a polyphenol oxidase inhibitor. As clearly seen in Table II, ascorbic acid-cinnamate and ascorbyl palmitate-cinnamate combinations were more effective in controlling browning in juice than either ascorbic acid or ascorbyl palmitate alone.

An acidic polyphosphate having a 1:1 ratio of $P_2O_5$:-$Na_2O$ was obtained from International Sourcing Inc., of Ridgewood, N.J. under the tradename of "Sporix." The addition of about 0.6% Sporix to Granny Smith juice effectively controlled browning during 24 hr at 20 C. while 0.57 mM ascorbic acid failed after 1 hr (Table III, Expt. 8). The Sporix level could be reduced up to 50% when combined with 0.57 mM or 1.14 mM ascorbic acid. Such combinations were effective in controlling browning up to 24 hrs (Table III, Expt. 9 and 10). It was also shown that the ability of Sporix to control browning in juice was pH-dependent. Although not reduced to values obtained with ascorbic acid alone, percent inhibition values for a Sporix-ascorbic acid combination were decreased when the pH of the treated juice was increased from 3.1 to 3.3, the pH of untreated juice, by addition of NaOH (Table III, Expt. 11).

Dips containing combinations of Sporix with ascorbic acid or ascorbic acid-2-phosphate were also highly effective in inhibiting enzymatic browning on the cut surfaces of apple plugs. As shown in Table IV, apple plugs dipped in 56.8 mM (1%) ascorbic acid in combination with 0.25% Sporix showed little or no evidence of browning after 24 hr at 20° C. while untreated controls discolored within several hours (Expt. D). Sporix alone was ineffective under these conditions.

TABLE I

Inhibition of enzymatic browning of cut surface of raw apples by ascorbic acid esters[a] and compositions thereof as compared with ascorbic acid

| Cultivar | Treatment (Dip Conc.) | Percent Inhibition 2 hr | 6 hr | 24 hr | Lag (min) | Slope[b] (min$^{-1}$) |
|---|---|---|---|---|---|---|
| Red Delicious | 22.7 mM AAP[c] | 93 | 38 | 39 | 120 | −3.2 |
| Red Delicious | 22.7 mM AA[c] | −3 | −16 | −7 | 14 | −3.2 |
| Red Delicious | 45.4 mM AAP[c] | 109 | 106 | 75 | >360 | 0 |
| Red Delicious | 45.4 mM AA[c] | 107 | 116 | 27 | >360 | 0 |
| Red Delicious | 45.4 mM AATP[d] | 71 | 86 | 83 | 10 | −1.7 |
| Red Delicious | 45.4 mM AA[d] | 28 | 42 | 45 | 10 | −4.8 |
| Red Delicious | 4.6 mM AP[e] | 80 | 97 | 118 | >360 | 0 |
| Red Delicious | 4.6 mM AA[f] | −11 | −1 | 4 | <10 | −3.2 |
| Winesap | 4.6 mM AP[e] | 72 | 98 | 111 | >360 | 0 |
| Winesap | 45.4 mM AA | 50 | 48 | −94 | 25 | −6.6 |

[a]AAP = ascorbic acid-2-phosphate, AA= ascorbic acid, AP = ascorbyl-6-palmitate, AATP = ascorbic acid-2-triphosphate.
[b]L vs log time curve.
[c]In 1% citric acid.
[d]In 0.15 M acetate buffer, pH 5.
[e]Emulsified with low hydrophilic/lipophilic balance emulsifier (Durkee EC-25) in 0.05 M phosphate buffer, pH 7.
[f]In 0.05 M phosphate buffer, pH 7.

TABLE II

Inhibition of enzymatic browning by ascorbic acid derivatives and compositions thereof in Granny Smith juice

| Expt. | Treatment[a] | Percent Inhibition 1 hr | 2 hr | 3 hr |
|---|---|---|---|---|
| 1 | 0.57 mM AAP | 105 | 76 | 77 |
|   | 0.57 mM AA | 148 | 60 | 2 |
|   | 1.14 mM AAP | 76 | 72 | 72 |
|   | 1.14 mM AA | 102 | 49 | 10 |
| 2 | 0.57 mM AP | 76 | 45 | 21 |
|   | 0.57 mM AA | 8 | 6 | 12 |
|   | 1.14 mM AP | 96 | 88 | 70 |
|   | 1.14 mM AA | 91 | 51 | 23 |
| 3 | 1.14 mM AP + 0.67 mM CIN | 98 | 96 | 76 |
|   | 1.14 mM AP | 57 | 27 | 27 |
|   | 0.67 mM CIN | 97 | 74 | 35 |
| 4 | 1.14 mM AA + 0.67 mM CIN | 98 | 98 | 52 |
|   | 1.14 mM AA | 35 | 10 | 24 |
|   | 0.67 mM CIN | 98 | 79 | 43 |

[a]AAP = ascorbic acid-2-phosphate, AA = ascorbic acid, AP = ascorbyl-6-palmitate, CIN = sodium cinnamate.

TABLE III

Inhibition of enzymatic browning in Granny Smith juice by Sporix and combinations of Sporix with ascorbic acid (AA)

| Expt. | Treatment | Percent Inhibition[b] L-value 1 hr | 6 hr | 24 hr | a-value 1 hr | 6 hr | 24 hr | L[c] Control |
|---|---|---|---|---|---|---|---|---|
| 8 | 0.29% Sporix | 73 | 74 | 73 | 56 | 59 | 50 | −5.7 |

TABLE III-continued

Inhibition of enzymatic browning in Granny Smith juice by Sporix and combinations of Sporix with ascorbic acid (AA)

| | | Percent Inhibition[b] | | | | | | $L^c$ |
|---|---|---|---|---|---|---|---|---|
| | | L-value | | | a-value | | | |
| Expt. | Treatment | 1 hr | 6 hr | 24 hr | 1 hr | 6 hr | 24 hr | Control |
| | 0.59% Sporix | 107 | 119 | 128 | 82 | 82 | 73 | −5.7 |
| | 0.88% Sporix | 101 | 119 | 127 | 83 | 80 | 74 | −5.7 |
| | 0.57% mM AA | 68 | −22 | −28 | 68 | −4 | −8 | −5.7 |
| 9 | 0.14% Sporix + 0.57 mM AA | 107 | 26 | 10 | 66 | 41 | 34 | −3.2 |
| | 0.29% Sporix + 0.57 mM AA | 115 | 110 | 132 | 72 | 70 | 56 | −3.2 |
| | 0.14% Sporix | 14 | 15 | 15 | 14 | 34 | 28 | −3.2 |
| | 0.29% Sporix | 59 | 59 | 58 | 34 | 48 | 43 | −3.2 |
| | 0.57 mM AA | 76 | −34 | −32 | 44 | −16 | −17 | −3.2 |
| 10 | 0.29% Sporix + 0.57 mM AA | 57 | 80 | — | 83 | 73 | — | −6.6 |
| | 0.29% Sporix + 1.14 mM AA | 89 | 102 | — | 71 | 68 | — | −6.6 |
| | 0.29% Sporix | 66 | 91 | — | 5 | 47 | — | −6.6 |
| | 0.57 mM AA | 9 | −28 | — | −12 | −30 | — | −6.6 |
| | 1.14 mM AA | 115 | −12 | — | 76 | −30 | — | −6.6 |
| 11 | 0.29% Sporix + 0.57 mM AA (pH 3.1) | 102 | 110 | 112 | 78 | 84 | 76 | −6.1 |
| | 0.29% Sporix + 0.57 mM AA[d] (pH 3.3) | 68 | 33 | 25 | 64 | 58 | 52 | −6.1 |
| | 0.57 mM AA (pH 3.3) | 43 | 6 | 26 | 37 | 5 | −5 | −6.1 |

[b]Based on difference in L- or a- value between specified time and 5 min.
[c]Difference in L-value between 60 min and 5 min.
[d]Adjusted to pH of control with 10% NaOH.

TABLE IV

Inhibition of enzymatic browning of cut surface of apple by combinations of Sporix and ascorbic acid (AA) or ascorbic acid-2-phosphate (AAP)

| | | | Percent Inhibition | | | | Lag (min)[b] | | Browning rate (min$^{-1}$) | |
|---|---|---|---|---|---|---|---|---|---|---|
| | | | L-value | | a-value | | | | | |
| Expt. | Cultivar | Dip solution | 6 hr | 24 hr | 6 hr | 24 hr | L | a | L | a |
| A | Red Delicious | 22.7 mM AA + 0.25% Sporix | 124 | 123 | 78 | 57 | >360 | 180 | 0 | 0.6 |
| | | 22.7 mM AA + 0.50% Sporix | 104 | 139 | 80 | 49 | >360 | 180 | 0 | 0.5 |
| | | 22.7 mM AA | 71 | 83 | 56 | 41 | 45 | 60 | −2.7 | 1.4 |
| | | 0.25% Sporix | 41 | 51 | 32 | 30 | 10 | 0 | −1.4 | 0.4 |
| | | 0.50% Sporix | 28 | 43 | −5 | −9 | 17 | 10 | −1.2 | 0.4 |
| B | Winesap | 22.7 mM AA + 0.25% Sporix | 69 | 58 | 64 | 44 | 40 | 60 | −2.0 | 1.6 |
| | | 22.7 mM AA + 0.50% Sporix | 97 | 81 | 93 | 68 | >360 | >360 | 0 | 0 |
| | | 22.7 mM AA | −5 | 28 | 12 | 10 | 20 | 17 | −5.6 | 2.6 |
| | | 0.25% Sporix | 43 | 43 | 44 | 38 | 10 | 10 | −2.5 | 1.5 |
| | | 0.50% Sporix | 52 | 30 | 44 | 30 | 10 | 0 | −1.3 | 0.6 |
| C | Winesap | 22.7 mM AA + 0.25% Sporix | 107 | 111 | 92 | 78 | >360 | 120 | 0 | 0.4 |
| | | 22.7 mM AAP + 0.25% Sporix | 107 | 116 | 78 | 63 | >360 | 10 | 0 | 0.6 |
| | | 22.7 mM AA | 58 | 71 | 46 | 44 | 22 | 25 | −4.5 | 2.4 |
| | | 22.7 mM AAP | 90 | 112 | 63 | 57 | 30 | 0 | −1.6 | 0.4 |
| | | 0.25% Sporix | 51 | −34 | 34 | −41 | 10 | 10 | −2.1 | 1.4 |
| D | Red Delicious[c] | 56.8 mM AA + 0.25% Sporix | 109 ± 18 | 111 ± 32 | 98 ± 3 | 84 ± 12 | >360 | >360 | 0 | 0 |
| | Winesap[d] | 56.8 mM AA + 0.25% Sporix | 109 ± 25 | 109 ± 25 | 99 ± 4 | 91 ± 9 | >360 | >360 | 0 | 0 |

[b]Slope of L or "a" vs log time curve.
[c]Mean percent inhibition and standard deviation for 7 duplicate trials.
[d]Mean percent inhibition and standard deviation for 5 duplicate trials.

We claim:

1. A process for preserving mechanically injured raw fruit and vegetable products against enzymatic browning comprising subjecting said fruit and vegetable products to an effective antibrowning amount of a browning inhibitor selected from the group consisting of (A) an ascorbic acid ester from the group consisting of ascorbic acid-2-phosphate, ascrobic acid-2-diphosphate, ascorbic acid-2-triphosphate and ascorbic acid-2-polyphosphate; (B) an ascorbic acid ester selected from the group consisting of ascorbyl-6-palmitate, ascrobyl-6-laurate, ascorbyl-6-deconoate and ascorbyl-6-octonoate; and (C) combinations thereof, for a period of time sufficient to inhibit browning.

2. The process of claim 1 wherein the browning inhibitor is an ascorbic acid ester selected from the group consisting of ascorbic acid-2-phosphate, ascorbic acid-2-diphosphate, ascorbic acid-2-triphosphate and ascorbic acid-2-polyphosphate.

3. The process of claim 1 wherein the browning inhibitor is an ascorbic acid ester selected from the group consisting of ascorbyl-6-palmitate, ascorbyl-6-laurate, ascorbyl-6-decanoate and ascorbyl-6-octanoate.

4. The process of claim 1 wherein the browning inhibitor is contained in an aqueous carrier solution.

5. The process of claim 1 wherein the browning inhibitor further comprises ascorbic acid.

6. The process of claim 1 wherein the browning inhibitor further comprises erythorbic acid.

7. The process of claim 1 wherein the browning inhibitor further comprises a polyphenol oxidase inhibitor.

8. The process of claim 1 wherein the browning inhibitor further comprises an emulsifying agent.

9. The process of claim 1 wherein the browning inhibitor further comprises a complexing agent.

10. The process of claim 9 wherein the complexing agent is an acidic polyphosphate having a 1:1 ratio of $P_2O_5:Na_2O$.

11. The process of claim 1 wherein the raw fruit and vegetable product is a juice.